(12) United States Patent
Janssen

(10) Patent No.: US 9,374,502 B2
(45) Date of Patent: Jun. 21, 2016

(54) METHOD FOR CONVERTING A FULL COLOUR IMAGE TO A MONOCHROME IMAGE

(71) Applicant: OCE-TECHNOLOGIES B.V., Venlo (NL)

(72) Inventor: Johannes H. M. Janssen, Velden (NL)

(73) Assignee: OCE-TECHNOLOGIES B.V., Venlo (NL)

( * ) Notice: Subject to any disclaimer, the term of this patent is extended or adjusted under 35 U.S.C. 154(b) by 123 days.

(21) Appl. No.: 14/204,134

(22) Filed: Mar. 11, 2014

(65) Prior Publication Data

US 2014/0193067 A1  Jul. 10, 2014

Related U.S. Application Data

(63) Continuation of application No. PCT/EP2012/067307, filed on Sep. 5, 2012.

(30) Foreign Application Priority Data

Sep. 12, 2011  (EP) .................................... 11180857

(51) Int. Cl.
| | |
|---|---|
| G06K 9/00 | (2006.01) |
| H04N 1/56 | (2006.01) |
| H04N 1/40 | (2006.01) |
| H04N 9/64 | (2006.01) |

(52) U.S. Cl.
CPC ............ *H04N 1/56* (2013.01); *H04N 1/40012* (2013.01); *H04N 9/646* (2013.01)

(58) Field of Classification Search
None
See application file for complete search history.

(56) References Cited

U.S. PATENT DOCUMENTS

| 5,130,786 A * | 7/1992 | Murata ................ H04N 11/042 375/240.25 |
| 7,333,117 B2 * | 2/2008 | Kim ........................ H04N 9/68 345/549 |

(Continued)

FOREIGN PATENT DOCUMENTS

EP       1292112 B1      2/2011

OTHER PUBLICATIONS

Grundland et al., "Decolorize: Fast, contrast enhancing, color to grayscale conversion", Pattern Recognition 40 (2007): pp. 2891-2896.*

(Continued)

*Primary Examiner* — Utpal Shah
*Assistant Examiner* — Samah Beg
(74) *Attorney, Agent, or Firm* — Birch, Stewart, Kolasch & Birch, LLP

(57) ABSTRACT

A method for converting a full color image to a monochrome image is provided, wherein the color values of pixels are decomposed in a luminance and a chrominance component. Both components are converted to a grayscale value representing an intensity of a pixel. The luminance grayscale value is in a limited range close to a light end of the available grayscale. The chrominance grayscale value is closer to the dark end of the available grayscale when the chrominance component of the color value is larger. The darkest value of the two converted values is selected for a corresponding pixel. The effect of this conversion is that colored pixels are darker than colorless pixels, which is useful to highlight parts of a monochrome image that stand out because of their color in a full color image. It is particularly useful to help color blind people recognize colored parts of an image.

11 Claims, 3 Drawing Sheets

(56) References Cited

U.S. PATENT DOCUMENTS

| | | | | |
|---|---|---|---|---|
| 7,656,414 B2* | 2/2010 | Pellar | | H04N 1/40012 345/589 |
| 7,706,606 B1* | 4/2010 | Ruzon | | H04N 1/40012 382/162 |
| 2004/0080789 A1* | 4/2004 | Anderson | | H04N 1/40012 358/2.1 |
| 2004/0257378 A1* | 12/2004 | Braun | | G06K 15/02 345/591 |
| 2005/0207641 A1* | 9/2005 | Bala | | H04N 1/40012 382/162 |
| 2005/0243347 A1* | 11/2005 | Hayaishi | | H04N 1/40012 358/1.9 |
| 2006/0061586 A1* | 3/2006 | Brulle-Drews | | A61B 3/066 345/594 |
| 2007/0291314 A1* | 12/2007 | Kadota | | H04N 1/40012 358/3.1 |
| 2008/0181491 A1 | 7/2008 | Bala et al. | | |
| 2008/0198172 A1* | 8/2008 | Chang | | H04N 1/40012 345/593 |
| 2008/0218801 A1* | 9/2008 | Li | | H04N 1/40012 358/2.1 |
| 2008/0231902 A1* | 9/2008 | Roome | | G06K 15/129 358/2.1 |
| 2008/0247620 A1* | 10/2008 | Lewis | | G02B 27/017 382/128 |
| 2008/0292204 A1* | 11/2008 | Itoh | | G06T 7/0085 382/266 |
| 2009/0128871 A1* | 5/2009 | Patton | | G06T 11/001 358/520 |
| 2009/0180164 A1* | 7/2009 | Miyagi | | H04N 1/40012 358/518 |
| 2010/0195162 A1 | 8/2010 | Majewicz | | |
| 2010/0254601 A1* | 10/2010 | Ng | | H04N 1/40012 382/167 |
| 2011/0149308 A1* | 6/2011 | Hinds | | H04N 1/40012 358/1.9 |
| 2011/0176176 A1* | 7/2011 | Sakai | | H04N 1/40012 358/3.01 |
| 2011/0286667 A1* | 11/2011 | Hayashi | | H04N 1/644 382/167 |
| 2012/0062914 A1* | 3/2012 | Iwamoto | | H04N 1/40012 358/1.9 |
| 2012/0327488 A1* | 12/2012 | Ito | | H04N 1/62 358/530 |
| 2013/0016901 A1* | 1/2013 | Iwaki | | H04N 1/407 382/162 |
| 2015/0085322 A1* | 3/2015 | Masaru | | G06K 15/1878 358/3.21 |

OTHER PUBLICATIONS

Bala et al., "Color-to-grayscale conversion to maintain discriminability", Color Imaging IX: Processing Hardcopy, and Applications, Proceedings of SPIE-IS&T Electronic Imaging, SPIE, US, vol. 5293, Jan. 20, 2004, pp. 196-202.

Gooch A A et al., "Color2Gray: salience-preserving color removal", ACM Transactions on Graphics: TOG, ACM, US, vol. 24, No. 3, Jul. 1, 2005, pp. 634-639.

* cited by examiner

METHOD FOR CONVERTING A FULL COLOUR IMAGE TO A MONOCHROME IMAGE

BACKGROUND OF THE INVENTION

1. Field of the Invention

The present invention relates to a method for converting a full color image into a monochrome image, the full color image comprising pixels that have a color value and the monochrome image comprising pixels that have a grayscale value within a full range from dark to light. The invention further relates to a print system, configured to perform said method.

2. Description of the Related Art

Color is used in images for a variety of reasons. A first reason is to obtain naturalness in an image, such as in photographic images. A further reason to use color is to make the image esthetically pleasing, such as in architectural and computer graphics. Color is also used to enhance the contrast in images, such as in business graphics and maps, or to group parts that belong to a similar function in an engineering drawing. Furthermore color is use to draw attention to a certain part in a large image, such as by highlighting an important area or an area where changes have been made in a drawing.

Still, many devices can only render one color in various tones against a background of another color. These devices render monochrome images. Hardcopies of this kind are printed by developing marking material such as black toner or ink on a contrasting background, such as white paper. These hardcopies or printouts are not only less expensive than their colored counterparts, but are also often more robust. An additional advantage is that their perception is less ambiguous for the considerable minority of persons that suffer from some form of color vision deficiency, also known as color blindness. Obviously, full color rendering devices, that use more than one colored marker, such as full color print engines, may also be used to make monochrome images.

However, many images are electronically or physically available with colors. In their digital form, which may be obtained by scanning the image in a conversion device, this means that a pixel in the image is characterized by a value that has more than one component, such as by three components in an RGB-image or by four components in a CMYK-image. Other color systems, such as Lab and YCrCb, may also be used to specify the color value of the pixels. Conversion of values within one color system to values within another color system are well-known. When these images are presented for reproduction as a monochrome image to a rendering device, a conversion is necessary from the full color characterisation of the pixels to a grayscale characterisation. A grayscale comprises values within a range from dark to light, corresponding to a maximum to a minimum of marking material for each pixel in a hardcopy of the image or, equivalently, corresponding to an intensity characterisation of the pixels in the image from high intensity to low intensity. A problem one is faced with is how to map the large multitude of colors to the limited number of tonal values in the grayscale.

A very often used approach is to use a transformation that retains a luminance channel of the color information or a derivative thereof. Of course, the distinction between two different colors of similar luminance is lost in this transformation, which is particularly objectionable if these two colors are spatially adjacent. Effort has been directed to solve this problem by making a cluster analysis of colors occurring in the image and optimise an agreement between a distance of colors and corresponding distance of grayscale values, as described in EP 1 292 112 B1. Another approach is given in US 2008/0181491 A1, wherein a high pass filtering of a chrominance component of the color image is used to modify the monochrome image that is based on a luminance component. Both approaches aim at a natural representation of the image in the form of a monochrome image, wherein color contrast is preserved.

In the function of highlighting parts of a large image by the use of color, the former approaches do not work. Although colors are mutually discernable, the luminance of the colors are on the grayscale between the dark value that corresponds to black colors and the light value that corresponds to white colors. In fact, all colors turn to gray and do not stand out amongst non-colored parts of the original image. Therefore, the highlighting function of the colors is lost in rendering a monochrome representation. Hence, a problem exists in transforming a color image in which color is used to highlight parts relative to non-colored parts, into a monochrome image.

An object of the present invention is to have a method for converting a full color image wherein colored parts attract attention relative to non-colored parts, into a monochrome image wherein the corresponding parts are highlighted.

SUMMARY OF THE INVENTION

According to the present invention, the method for converting a full color image into a monochrome image comprises the steps of selecting a pixel of the full color image, decomposing the color value of the pixel into a luminance and a chrominance component, converting the luminance component into a first grayscale value within a first range that is substantially smaller than the full range from dark to light and substantially on the light side of the full range, converting the chrominance component into a second grayscale value within a second range that extends beyond the first range in the direction of the dark side of the full range, selecting the darkest value from the first and second grayscale values as the grayscale value of a corresponding pixel within the monochrome image, and repeating these steps until all pixels have been selected. The effect of these steps is that parts of the image that do not have much color are rendered light gray, whereas colorful parts of the image are rendered dark gray or even black. Because even black parts in the full color image are transformed to light gray values, the dark gray parts in the monochrome image correspond to the highlighted parts of the full color image and are readily discerned.

In a further embodiment, the first grayscale value is within a range that is one quarter of the full range from dark to light on the light side of the full range. This further enhances the effect of colorless parts being rendered light gray and makes the dark parts even more conspicuous.

In a further embodiment, the chrominance component is projected onto a number of predetermined color directions to obtain a number of colorscale values, a colorscale value indicating the amount of color for a color direction, which are converted into a grayscale value according to corresponding predetermined transfer functions. The darkest grayvalue is then selected as the second grayvalue. This enhances the contrast between colors with a similar chrominance component, but pointing in a different direction in the color space.

In a further embodiment, the full color image is defined in R, G, and B channels, that characterise the red, green, and blue content of the image, defining for each pixel an R, G, and B component. These components are algebraically combined to find a luminance and a chrominance component for each pixel. This provides an easy way for an implementation of the invented method.

In a further embodiment, the chrominance component is projected onto three predetermined color directions which are not parallel to the luminance direction to obtain three colorscale values, the colorscale values are converted into grayscale values according to a number of predetermined transfer functions and the darkest grayscale value is selected as the second grayscale value. The effect of this is that a better discrimination among saturated colors is obtained.

In a further embodiment, the color value of the pixels are converted into conventional L*, a* and b* components from which the luminance and chrominance components are derived. The behavior and interpretation of L*, a* and b* components is amply known and therefore these components are very proper for interpretation in luminance and chrominance. Preferentially the luminance component is associated with the L* component and the chrominance component comprises the a* and b* components.

In an embodiment, a print system, comprising an image processing unit for converting digital image data into print data, and a print engine for applying marking material on a medium according to print data to make a hard copy of an image, the image processing unit is configured to apply one of the above-mentioned methods. In this way the print system is capable of making a monochrome representation of images wherein the parts that are emphasised by using color are converted to parts that are emphasised by a dark intensity. In the print system, a scanner may be comprised for converting a hard copy original to a full color digital image, that is processed by the image processing unit for obtaining a monochrome image. This is particularly useful when marking points of interest in a monochrome printout of a drawing with a colored marker, e.g. a red pen or pencil.

Further object, features and advantages of the method and the print system will be apparent from the more particular description of the exemplary embodiments of the method and the print system, as illustrated in the accompanying drawings in which like reference numbers refer to the same parts throughout the different figures. The drawings are not necessarily to scale, emphasis instead being placed upon illustrating the principle of the method.

BRIEF DESCRIPTION OF THE DRAWINGS

Hereinafter the present invention is further elucidated with references to the appended drawings showing non-limiting embodiments and wherein.

DETAILED DESCRIPTION OF EMBODIMENTS

Figure 1:
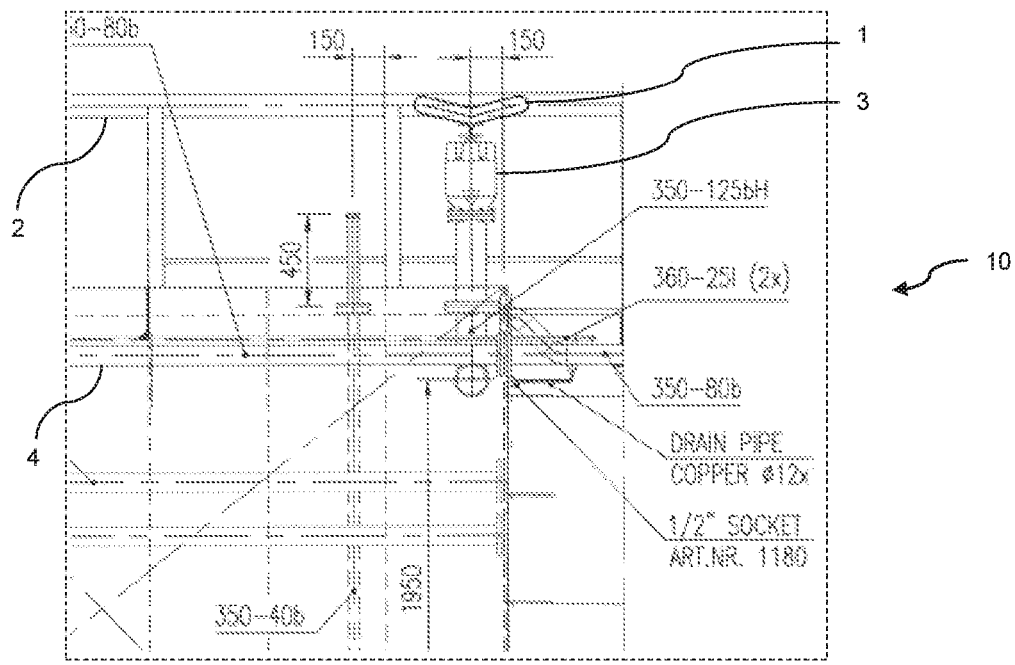
FIG. 1 shows a line drawing that is converted from a color original according to a method as known in the prior art.

FIG. 1 shows, in its monochrome form, a line drawing 10 that in its original form contains colored and not colored lines after conversion according to a conventional color to monochrome conversion method. This kind of methods emphasize the naturalness of the rendering, meaning that a black line 1, and a gray line 2 are rendered with a comparable lightness as in the original line drawing, whereas a red line 3 and a green line 4 are rendered in gray, corresponding to the lightness of the colors. The colored lines, being associated with highlighted parts compared to the not colored lines, are found to be indiscernable in the monochrome line drawing.

Figure 2:
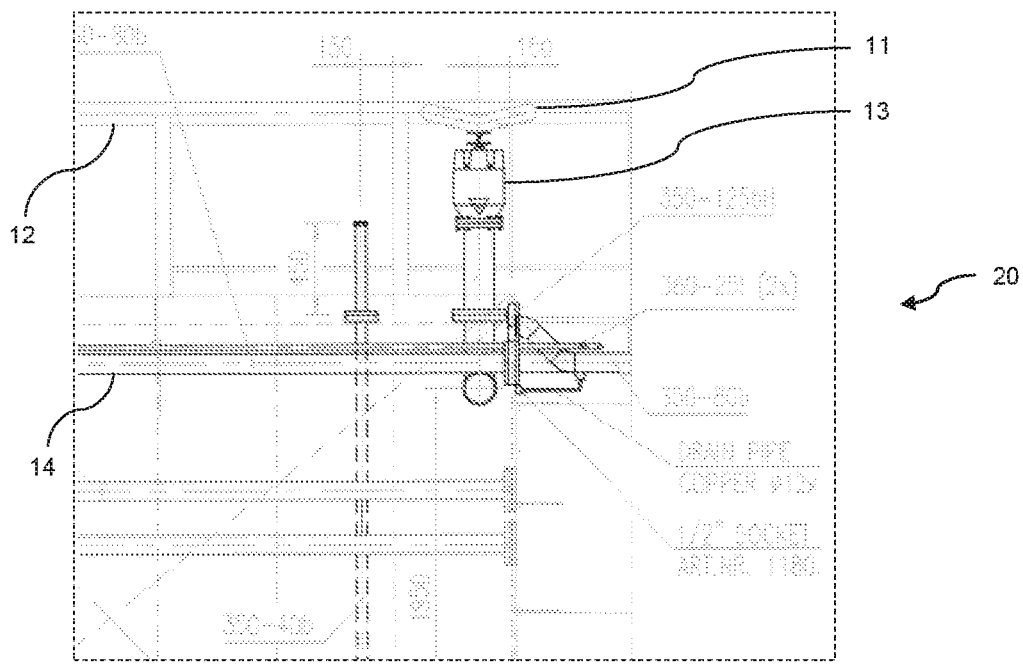
FIG. 2 shows the same original line drawing as in FIG. 1 converted through the invented method.

FIG. 2 shows the same part of the line drawing 20 in its monochrome form after conversion according to the invented method. A black line 11 and a gray line 12 are rendered in a light gray tone, whereas a red line 13 and a green line 14 are rendered in a dark gray tone, which makes them stand out against the light gray lines. This method of conversion therefore preserves the color highlighting.

Figure 3:
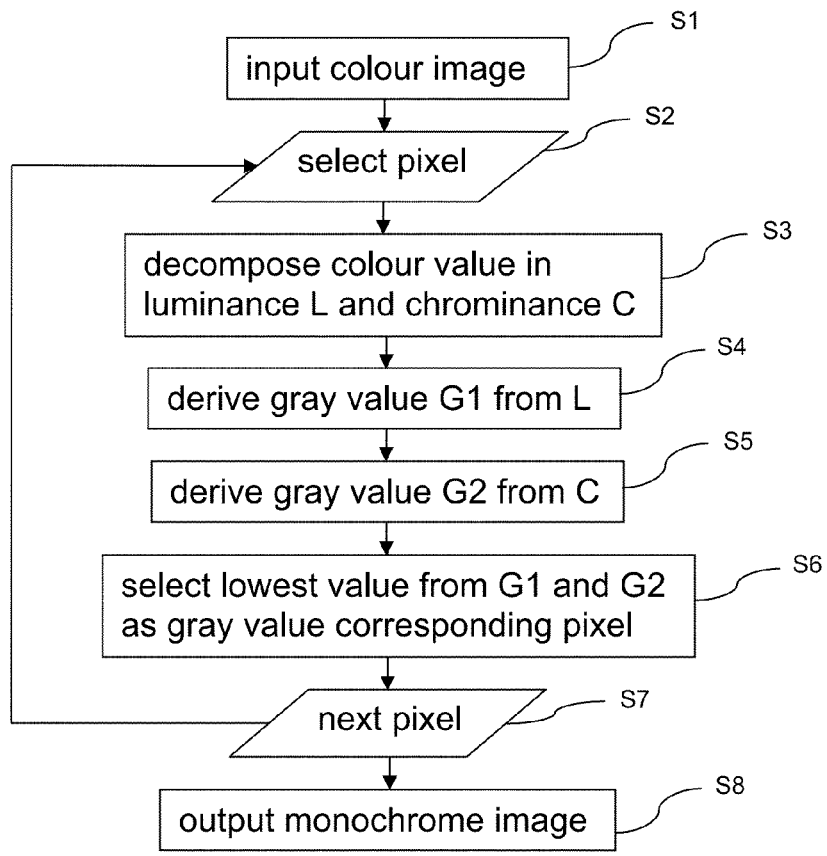
FIG. 3 is a stepwise embodiment of the invented method.

FIG. 3 shows an embodiment with the individual steps of the invented method. First, a color comprising image is received S1 in the method. The image comprises pixels having a color value according to some color system, such as RGB, CMYK, L*a*b*, or another color system. Conversions among these color systems are well known. For each individual pixel S2, this color value is decomposed S3 in a luminance L and a chrominance C. For example, in the RGB color system a luminance may be found by $$L = \tfrac{1}{3}R + \tfrac{1}{3}G + \tfrac{1}{3}B, \quad (1)$$

giving equal weight to the color channels R, G and B. In an eight bit representation each of the values R, G, and B take values from 0 to 255. Hence, the luminance will also have a full range from 0, representing dark, to 255, representing light. The chrominance C has one or more components, all ranging from 0 to a maximum value. In the RGB color system, two components of the chrominance may be expressed as $$C1 = |R-G|, \text{ and } C2 = |G-B|, \quad (2)$$

wherein the bars indicate an absolute value of the difference. A further way of deriving a one-dimensional luminance value L from a three-dimensional RGB color value is $$L = 0.30R + 0.59G + 0.11B, \quad (3)$$

which gives more weight to the green channel and less to the blue channel. In the present invention, it is also possible to have a gamma correction in the individual color channels. Another way of decomposing a color value into a luminance and chrominance component is to convert the color value in L*a*b* components according to a calibration or according to a fixed relation and to derive a luminance value from L* and a chrominance component from a* and b*.

In a next step S4, a gray value G1 is derived from the luminance L. The range of the value G1 is a substantially smaller range than the value of L, e.g. from 192 to 255 in the example of L ranging from 0 to 255. The conversion may be linear, but some non-linear tuning gives better results. The range of G1 is on the light side of the full range, making the conversion originating from the luminance light gray. It is preferred that the derivative of the conversion function of L to G1 keeps the same sign.

In step S5, the chrominance component C is converted to a gray value G2 which is a value in the full range of gray values. When the chrominance has multiple components, a selection from several values may be necessary. In the example of equation (2), C1 is in the range of 0 to 255 and a corresponding gray value GC1 is found from a non-linear conversion, wherein light gray corresponds to low values of C1 and dark gray corresponds to high values of C1. For C2, a similar conversion is made, although a different non-linear function may be used for the conversion to GC2. The gray value G2 is derived from the minimum of GC1 and GC2, corresponding to the darkest gray of the two values. In another embodiment, the chrominance has three components, which are converted each to a gray value. These components are obtained e.g. by projecting the color value, which is a vector in an associated color space, to predetermined directions in this space. Excluding negative values, the value ranges from 0 to a maximum value and a colorscale value in a range from 0 to 1 is obtained that is indicated by its relative value to the maximum. This is also possible in L*a*b* space where the color value of a pixel is projected to directions in the a*b* plane. A preferably good conversion is obtained when a first direction is selected having an angle of 21 degrees with the positive a*-direction, a second direction in the negative a*-direction and a third direction in the negative b*-direction. These components are all transformed according to an associated non-linear function that transforms the low colorscale values to light gray values and high colorscale values to dark gray values. The darkest gray value is selected as the gray value derived from the chrominance component.

In step S6, the darkest gray value originating from the luminance and chrominance component is selected as the gray value of the corresponding pixel in the monochrome image. When the gray value of the chrominance component is darker than the minimum value of the substantially smaller range for the luminance gray values, in the example above, lower than 192, the chrominance gray value will always be selected. In the monochrome image, these pixels will be darker than the rest of the pixels and therefore will be conspicuous in their environment. Step S7 indicates that next pixels will be selected until all pixels have been converted to a gray value. In step S8 a monochrome image is obtained.

Figure 4:
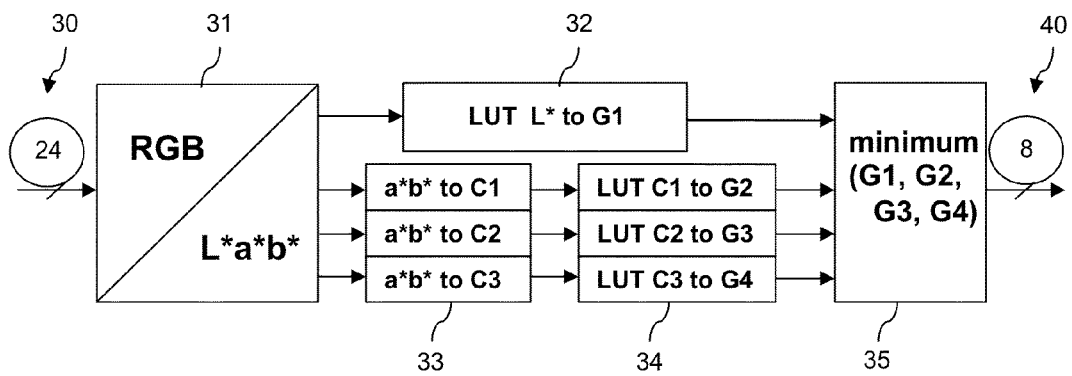
FIG. 4 is an schematic embodiment for hardware implementation.

In FIG. 4, an embodiment with a number of parallel paths is shown that is particularly suitable for hardware implementation, but is also applicable in a software implementation. In a data stream a 24-bit color pixel enters the process pipeline at 30 and leaves after conversion the process pipeline at 40 as an 8-bit monochrome pixel. The RGB/L*a*b* convertor 31 converts the incoming color value to an L*a*b* value, according to a table, possibly using an interpolation of a number of tabulated values. The L* value is used as luminance component and is directed to a LookUpTable (LUT) 32 for immediate conversion into a first gray value G1. G1 is in a range in which only light gray to white values are available. The a* and b* components are used as chrominance component and are directed to the convertor 33, that determines the projection of the a*b* direction to predetermined directions in the L*a*b* color space. The colorvalues C1, C2, C3 are in a range from 0 to 1, indicating the length of the projection in e.g. a direction along the positive a* axis, a direction along the negative a* axis, and a direction along the negative b* axis, relative to the maximum length of these projections. In a triple LUT 34, these colorvalues are converted to a gray value each following a separately tuned course. The minimum module 35 determines the lowest value of the four gray values that corresponds to the darkest gray which is the output of the conversion.

Figure 5:
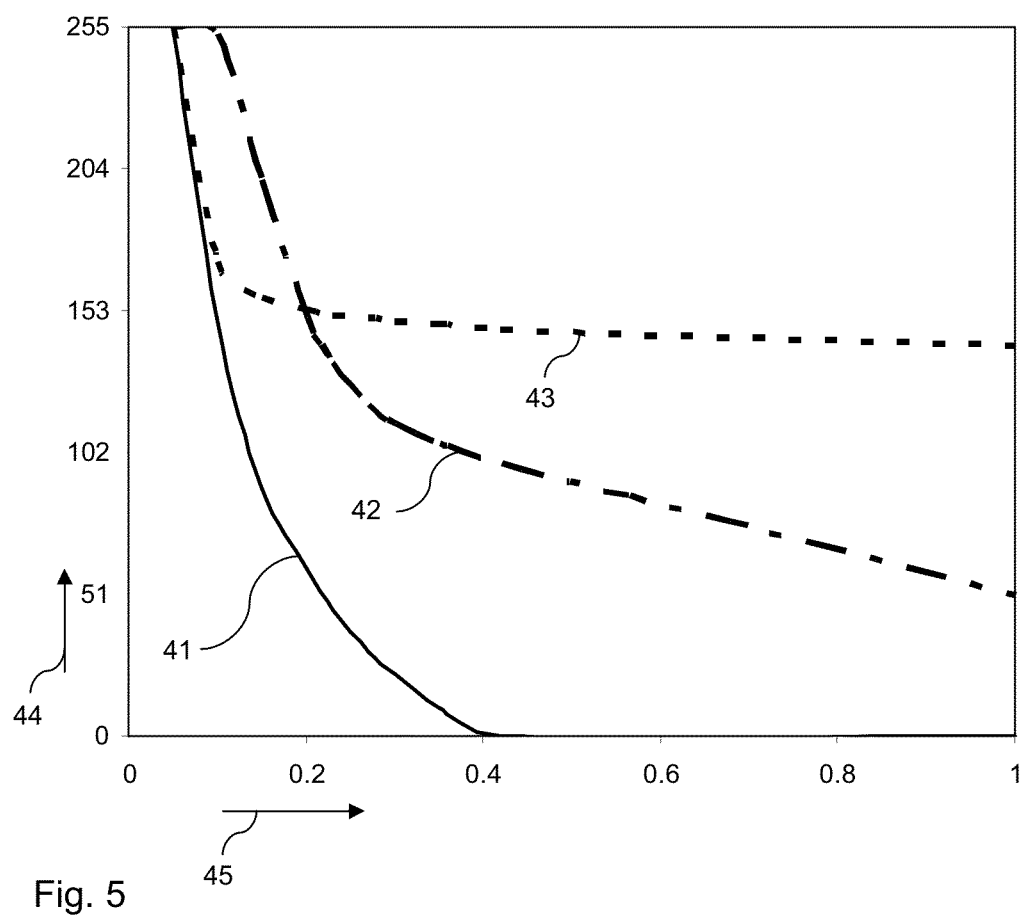
FIG. 5 shows a graph of the content of a number of Look-UpTables (LUT) that may be used in the embodiment of FIG. 4.

In FIG. 5, a possible content of the triple LUT 34 is shown as three curves 41, 42 and 43 indicating relations between a colorvalue along the horizontal axis 45 and a grayvalue along the vertical axis 44. All curves start with a horizontal part along the maximum grayvalue 255 for the lowest colorvalues for which the chrominance component in a predetermined direction is small. Using the curve 41 in LUT 34 for the conversion of colorvalue C1 to grayvalue G2 means that for C1 higher than 0.4, G2 is made 0, corresponding to black. Therefore, colored pixels having a chrominance component that is pointing strongly in the predetermined direction belonging to C1, will obtain a grayvalue that corresponds to black, because this value is always lower than the grayvalue associated with the luminance component.

The above disclosure is intended as merely exemplary, and not to limit the scope of the invention, which is to be determined by reference to the following claims.

What is claimed is:

1. A method for converting a full color image into a monochrome image, the full color image comprising pixels that have a color value and the monochrome image comprising pixels that have a grayscale value within a full range from dark to light, corresponding to a maximum amount of marking material to a minimum amount of marking material respectively, the method comprising the steps of:
 a) selecting a pixel of the full color image;
 b) decomposing the color value of the pixel into a luminance component and a chrominance component;
 c) converting the luminance component having a luminance value into a first grayscale value within a first range that is smaller than the full range from dark to light and on the light side of the full range;
 d) converting the chrominance component into a second grayscale value within a second range that extends beyond the first range in the direction of the dark side of the full range, wherein when the chrominance component includes multiple components, each of the multiple components having a chrominance value, the component having a higher chrominance value is converted to a grayscale value corresponding to a greater amount of marking material than the component having a lower chrominance value;
 e) selecting a value with the greatest amount of marking material from the first and second grayscale values as the grayscale value of a corresponding pixel within the monochrome image, and
 f) repeating steps a) to e) until all pixels have been selected, wherein grayscale values associated with the highest chrominance values correspond to greater amount of marking material than grayscale values associated with the lowest luminance values.

2. The method according to claim 1, wherein the first grayscale value is within a range that is one quarter of the full range from dark to light on the light side of the full range.

3. The method according to claim 1, wherein the step of converting the chrominance component into a second grayscale value comprises the steps of d1) projecting the chrominance component onto a number of predetermined color directions to obtain a number of colorscale values; d2) converting the colorscale values into grayscale values according to a number of predetermined transfer functions; and d3) selecting the darkest grayscale value as the second grayscale value.

4. The method according to claim 1, wherein the color value of pixels in the full color image is defined in R, G and B components and the luminance and chrominance components are calculated by linear combinations of the R, G and B components.

5. The method according to claim 4, wherein the chrominance component is projected onto three predetermined color directions to obtain three colorscale values, the colorscale values are converted into grayscale values according to a number of predetermined transfer functions and the darkest grayscale value is selected as the second grayscale value.

6. The method according to claim 1, wherein the color value of the pixels are converted into conventional L*, a* and b* components from which the luminance and chrominance components are derived.

7. The method according to claim 6, wherein the luminance component is derived from the conventional L* component and the chrominance component comprises the conventional a* and b* components.

8. The method according to claim 7, wherein the chrominance component is projected onto a number of predetermined color directions in the a*,b*-plane to obtain an equal number of colorscale values, the colorscale values are converted into grayscale values according to predetermined transfer functions and the darkest grayscale value is selected as the second grayscale value.

9. The method according to claim 8, wherein the number of predetermined color directions is three.

10. The method according to claim 9, wherein the three color directions comprise a first direction that makes an angle of 20 degrees with the positive a*-direction, a second direction that is parallel to the negative a*-direction, and a third direction that is parallel to the negative b*-direction.

11. A print system, comprising an image processing unit for converting digital image data into print data, and a print engine for applying marking material on a medium according to print data to make a hard copy of an image, wherein the image processing unit is configured to apply the method according to claim 1.

* * * * *